3,275,589
TERPOLYMER OF VINYL ACETATE, DIALKYL ESTER AND ALKYL ACRYLATE
Robert R. Alexander, Framingham, and Anthony J. Urjil, Byfield, Mass., assignors to W. R. Grace & Co., Cambridge, Mass., a corporation of Connecticut
No Drawing. Filed Feb. 14, 1963, Ser. No. 258,629
12 Claims. (Cl. 260—29.6)

This invention relates to permanently tacky adhesives for difficultly bondable polymer surfaces. More particularly, the present invention pertains to vinyl acetate terpolymers and latex emulsions thereof which are useful for laminating and adhesively securing polyethylene, polypropylene, and other strongly hydrophobic polymers to themselves and to other materials.

Polyolefins, such as polyethylene and polypropylene, possess many desirable properties, including excellent dielectric characteristics, an inert chemical nature, and insolubility in the presence of most chemicals and solvents which make them attractive and valuable materials for a wide variety of applications. However, these polymers possess a waxy, paraffin-like surface which is difficult to wet and is highly non-receptive to well known and commonly employed aqueous and solvent-based adhesives. Consequently, great difficulty has been encountered in bonding polyethylene and similar polymers because of adhesive failures which occur at the adhesive-polymer interface.

Numerous methods have been proposed and employed for altering the surface properties of polyethylene and similar materials in order to render their surfaces receptive to adhesives. Among the pretreatments employed are surface oxidation by means of flaming, irradiation, and treatment with liquid and gaseous oxidizing agents, subjecting the material to "shock-chilling" or similar treatment upon extrusion, and compounding with modifying substances such as chlorinated hydrocarbons. These methods, however, have certain disadvantages. In some instances they require elaborate and expensive equipment and procedures while in others they require the use of hazardous, highly corrosive chemicals. Moreover, the results have not been altogether satisfactory in terms of the strength and durability of the bonding achieved using conventional adhesives.

It is an object of the present invention to provide an improved adhesive which enables unmodified and untreated polyethylene, polypropylene and other strongly hydrophobic polymers to adhere to themselves and to other materials without pre-treating or modifying the surface of the plastic material. This objective is achieved by providing a permanently tacky polymer adhesive comprising vinyl acetate copolymerized with a major proportion of at least one alkyl ester of an $\alpha,\beta$-ethylenically unsaturated acid. The adhesive possesses an unusually high degree of tack and merges with surfaces on contact or with the application of only a slight amount of pressure and thereafter resists separation from the substrate. It is further characterized by an exceptionally high specific adhesion or strong molecular attraction for many different types of materials including polyolefins, such as, polyethylene and other materials, such as polyvinylhalides, polyesters, halogenated rubbers, cellophane, and so forth. By virtue of its high molecular attraction for a wide variety of substrates, chemical bonding may be achieved with most smooth surfaces where the lack of pores or voids would preclude satisfactory bonding through the interlocking action required for a strong mechanical bond. In addition to high tack and high specific adhesion, these adhesives also possess the high adhesive and cohesive strengths necessary for the formation of strong, permanent bonds at the adhesive-substrate interface as well as within the adhesive mass itself.

The permanently tacky polymer is preferably obtained from the polymerization of 100 parts by weight of a monomer mixture comprising 30 to 40 parts by weight of vinyl acetate and correspondingly from 60 to 70 parts by weight of (a) a monoalkyl ester of an $\alpha,\beta$-ethylenically unsaturated monocarboxylic acid or (b) a dialkyl ester of an $\alpha,\beta$-ethylenically unsaturated dicarboxylic acid or (c) mixtures of (a) and (b).

The comonomers polymerized with the vinyl acetate are monoalkyl esters of $\alpha,\beta$-unsaturated monocarboxylic acids having 3 to 5 carbon atoms, such as acrylic, methacrylic, and crotonic acids, and dialkyl esters of $\alpha,\beta$-unsaturated dicarboxylic acids having 4 to 5 carbon atoms, such as maleic, fumaric, and itaconic acids. Each alkyl moiety of the ester group should contain from 7 to 12 carbon atoms since the softness and deformability necessary for achieving high tack depend upon the number of carbon atoms in each alkyl substituent as well as on other factors, such as the proportion of comonomer employed, combination of comonomers, and degree of branching in the alkyl substituent. For example, esters containing less than 7 carbon atoms in each alkyl substituent tend to give polymers with vinyl acetate which exhibit only a very slight amount of tack while esters containing more than 12 carbon atoms in each alkyl substituent result in polymers which tend to be waxy rather than tacky. Though some branching may be present in the alkyl substituent, the degree of tackiness and flexibility desired for present purposes is best obtained, if each alkyl moiety has a straight chain of at least 6 carbon atoms terminating at the ester group. Representative of the esters which may be employed in the present invention are the octyl, iso-octyl, iso-nonyl, iso-decyl 2-ethylhexyl, iso-heptyl, decyl, undecyl, and dodecyl monoesters of acrylic, methacrylic, $\beta$-ethyl acrylic, and crotonic acid, and the corresponding diesters of maleic, fumaric, itaconic, mesaconic, and citraconic acid. If desired, small amounts of vinyl esters of alkane carboxylic acids, such as vinyl isooctonate and vinyl isononanoate, may be used in admixture with or substituted for small portions of the monoesters, diesters, and mixtures of monoesters and diesters described above.

The quantity of comonomer polymerized with the vinyl acetate should be at least 60 percent by weight and preferably, between 60 percent and 70 percent by weight of the total weight of monomers. When less than 60 percent of comonomer is employed, e.g. 50 parts comonomer and 50 parts vinyl actate, the resulting polymer though providing a permanently tacky film possessing satisfactory cohesive strength does not have the high amount of tack and high specific adhesion essential for bonding waxy, non-porous surfaces. On the other hand, when more than 70 percent of comonomer is employed, the polymers produced form gummy films having sufficient tack but lack internal or cohesive strength.

The adhesive and cohesive properties of the polymer compositions are also dependent to some extent upon the comonomer employed. For instance, a polymer of vinyl acetate containing a diester alone, such as dioctyl maleate, and a polymer of vinyl acetate containing a monoester alone, such as octyl acrylate, are both similar in effectiveness insofar as degree of tack is concerned but differences appear to exist in the nature of the tack. The polymer containing dioctyl maleate possesses a somewhat greater adhesive than cohesive strength and is characterized by a soft, gummy tack while the polymer containing octyl acrylate possesses a somewhat greater cohesive than adhesive strength and is characterized by a strong, snappy tack. Therefore, by varying the ratios of monoesters and diesters in the comonomeric constituents, it is possible to prepare tacky polymers having different relative amounts of adhesive and cohesive strengths as may be required for particular applications. Though 60 percent to 70 percent by weight of either a monoester or a diester in combination with the vinyl acetate provides products possessing the necessary tack and specific adhesion for securely adhering strongly hydrophobic substrates, additional improvement in adhesive and cohesive properties may be realized by utilizing a comonomer consisting of a mixture of a monoester and a diester. Preferred compositions of the present invention which possess the optimum balance between adhesive and internal bond strength as well as high tack and high specific adhesion include polymers comprising 40 parts by weight of vinyl acetate copolymerized with 60 parts by weight of a mixture containing 30 to 40 parts by weight of dioctyl maleate and 20 to 30 parts by weight of octyl acrylate. A particularly preferred composition comprises 40 parts by weight of vinyl acetate copolymerized with 40 parts by weight of dioctyl maleate and 20 parts by weight of octyl acrylate.

The tacky polymers may be easily prepared by any of the conventionally employed polymerization techniques, including bulk, solvent and emulsion polymerization. However, it is preferred to prepare the polymers of this invention in aqueous emulsion in order to obviate the use of expensive and hazardous solvents as polymerization or solvating media. The latex emulsions prepared in accordance with the present invention possess excellent chemical and mechanical stability thereby affording ease and simplicity for compounding with a wide variety of substances, such as pigments, solvents, and other latices. Moreover, these emulsions possess the high viscosity necessary to prevent "run-off" from non-porous substrates and also sorption into porous substrates upon the application of pressure.

The following examples and ensuing discussion will serve to illustrate the present invention more clearly.

Example 1

Monomer phase: Parts by wt.
Vinyl acetate _____ 33⅓
Di(2-ethylhexyl) maleate _____ 33⅓
2-ethylhexyl acrylate _____ 33⅓

Aqueous phase:

Nonyl phenol-ethylene oxide condensate, 86 percent by weight ethylene oxide (emulsifier) _____ 1.0
Complex phosphate ester of alkyl phenyl-ethylene oxide condensate, free acid form (emulfiers) _____ 2.0
Alkyl substituted starch ether (thickener) ___ 1.5
Polyvinyl alcohol—75–80 percent hydrolyzed (protective colloid) _____ 1.5
Ammonium hydroxide _____ 0.14
Water _____ 71.52

Initiator charge A:

Potassium persulfate _____ 0.42
Water _____ 8.40

Initiator charge B:

Potassium persulfate _____ 0.04
Water _____ 0.40

Neutralizing slurry:

Sodium bicarbonate _____ 0.25
Water _____ 0.25

The reaction vessel used was a stainless steel reactor of 15-gallon capacity equipped with heating and cooling means, a water-cooled return condenser, and an agitator providing 250 r.p.m. The water was first charged into the reactor and the nonyl phenol-ethylene oxide condensate, alkyl phenol-ethylene oxide phosphoric acid complex, ammonium hydroxide, polyvinyl alcohol, and etherified starch were then introduced with stirring in the above named order and with sampling between the addition of components in order to check the dissolution of each before adding the succeeding one. The aqueous phase was heated to 58° C. at which temperature 5 percent of the monomer phase was introduced over a period of about 5 minutes. When the temperature reached 65° C., the initiator charge A was added and after the temperature had reached 76° C., monomer addition was started at a rate of 24 parts per hour. This addition rate was doubled to 48 parts per hour when the temperature reached 79° C. and was held at the increased rate until 90 percent of the monomer had been added during which time the tempearture was maintained between 80–83° C. The remaining monomer was then added at the lower rate of 24 parts per hour. After monomer addition was completed and refluxing had terminated, initiator charge B was introduced and the batch was allowed to peak at a temperature between 87–89° C. Heating was continued for approximately one-half hour and then the batch was cooled. After the temperature had fallen to 30° C., the pH was adjusted to 4.5–5.5 with the neutralizing slurry containing the sodium bicarbonate.

Examples 2–9

A series of vinyl acetate-containing polymers were prepared in aqueous emulsion utilizing the procedure described in Example 1 above. The constitution of the monomer phase for each of the polymers prepared is set forth below. All quantities given are in parts by weight unless otherwise noted.

| No. Example | Vinyl acetate | Di(2-ethylhexyl) maleate | 2-ethylhexyl acrylate |
|---|---|---|---|
| 2 | 40 | 35 | 25 |
| 3 | 40 | 30 | 30 |
| 4 | 40 | 40 | 20 |
| 5 | 40 | -- | 60 |
| 6 | 40 | 60 | -- |
| 7 | 50 | 50 | -- |
| 8 | 50 | -- | 50 |
| 9 | 50 | 33 | 17 |

Each of the latex emulsions prepared in Examples 1–9 had a total solids content of 54–56 percent, a residual monomer content of less than 2 percent, an average particle size of about one micron and a viscosity in the range of 3000–5000 centipoises (Brookfield #4 Spindle, 60 r.p.m.). These emulsions possessed excellent mechanical stability and were further characterized by excellent stability to borax, solvents, thickeners, and other additives and also by excellent film consolidation at low temperatures.

The films prepared from these emulsions were clear, colorless, and water-resistant and were of a permanently tacky nature, that is, the films remained tacky even when exposed to the atmosphere for prolonged periods of time. However, variations in adhesive characteristics were noted among the samples, particularly in the amounts of tack and adhesive strength.

In the method employed for evaluating these properties, four strips of film from each polymer emulsion were drawn down on a glass plate. The width of each strip was 2.5 cm. while the thicknesses of the four films after drying were 1, 2, 3, and 4 mils, respectively. A sheet of paper or a sheet of plastic film of tetrafluoroethylene polymer or polyethylene was lightly affixed to the surface of the dried films on each plate and then was carefully withdrawn in a direction across the width of the strips. Using this apparent tack test, it was possible to observe the amount of tack as well as the adhesive strength of the various samples by determining the minimum film thickness at which really good adhesion was achieved.

Accordingly, it was found that the compositions prepared in Examples 1–6 gave films possessing an unusually high degree of tack and adhesive strength. The films prepared from these emulsions exhibited excellent adhesion in the range of 2–4 mils thickness while some of the products exhibited considerable tackiness and adhesive strength even in the 1–2 mil range. In comparison, the films prepared from the compositions of Examples 7–9, though somewhat tacky did not possess the degree of tack or adhesive strength necessary for accomplishing satisfactory bonding of waxy, plastic surfaces.

From the results of the apparent tack test, it is evident that the performance of the products obtained in Examples 1–9 was dependent upon the relative proportion of comonomer polymerized with the vinyl acetate. For example, it is readily apparent that the vinyl acetate polymers containing 60 percent by weight or more of comonomer formed films exhibiting a very marked as well as quite unexpected increase in tackiness over similar products containing the same comonomer in only slightly reduced amounts, i.e., 50 percent by weight.

*Example 10*

A polymer was prepared from a monomer mixture consisting of 30 parts by weight of vinyl acetate and 70 parts by weight of di(2-ethylhexyl) maleate using the procedure described in Example 1.

*Example 11*

A polymer was prepared according to the procedure of Example 1 from a monomer mixture consisting of 30 parts by weight of vinyl acetate and 70 parts by weight of 2-ethylhexyl acrylate.

Films from a sample of each of Examples 10 and 11 were prepared and evaluated using the apparent tack test described above. It was found that both polymers possessed the tackiness necessary for sticking to and securing plastic substrates. However, differences were apparent in the nature of the tack in that the polymer containing the maleate ester gave comparatively higher tack and higher adhesive strength but low cohesive strength while the polymer containing the acrylate ester showed less tack and lower adhesive strength but better cohesive strength.

*Examples 12–15*

Another series of vinyl acetate-containing polymers were prepared according to the method described in Example 1. The composition of the monomer phase for each example is given below. All quantities are in parts by weight unless otherwise specified.

| No. Example | Vinyl Acetate | Diisooctyl maleate | 2-ethylhexyl acrylate |
|---|---|---|---|
| 12 | 40 | 35 | 25 |
| 13 | 40 | 30 | 30 |
| 14 | 40 | 40 | 20 |
| 15 | 40 | 60 | |

The latex emulsions obtained in Examples 12–15 had the same total solids content as the emulsions of Examples 1–10. The films formed by the emulsions of Examples 12–15 were clear, colorless, and water-resistant and showed a retention of tack on aging at both elevated and room temperatures.

Except for the substitution of diisooctyl maleate for di(2-ethylhexyl) maleate, the polymers prepared in Examples 12, 13, 14, and 15 were identical to Examples 2, 3, 4, and 6, respectively. The adhesive properties of these two series of polymers were evaluated and compared using the procedure described above. The results showed no significant differences either in tackiness or adhesive strength between comparative Examples 2 and 12, 3 and 13, 4 and 14, and 6 and 15. When 40 parts by weight of dibutyl maleate was substituted for the di(2-ethylhexyl) and diisooctyl maleates in Examples 4 and 14, the product obtained possessed good film-forming properties but the films prepared exhibited insufficient tack for adhering plastic substrates.

From a further evaluation of the products obtained in Examples 2, 3, 4, 6, and 12–15, it was noted that the polymers possessed a high degree of specific adhesion i.e., molecular attraction, for most surfaces including polyethylene, polypropylene, polytetrafluorethylene, polyethylene terephthalate, and various other materials. The specific nature of the adhesion was apparent in that stronger bonding was achieved with low density polyethylene and polypropylene than with high density polyethylene and polytetrafluoroethylene. However, the differences observed were very slight and when films of the aforementioned plastic materials were laminated to kraft paper using a 3 mil film (dry) of the product of Example 4, paper failure occurred in most instances rather than bond failure at the adhesive-substrate interface or within the adhesive layer. Moreover, when the internal bonding strength of this same composition was tested at various film thicknesses between two smooth metal surfaces, the cohesive strength continued to increase with increasing film thickness and showed no tendency to drop-off in the range of 1 to 8 mils.

From the foregoing examples and discussion, it is evident that vinyl acetate polymers containing high levels of the particular alkyl esters of α, β-unsaturated acids described, give permanently tacky products possessing a high degree of tack. In addition, the products have a high specific adhesion for difficulty bondable plastic surfaces as well as excellent bonding strength. These characteristics together with the excellent compounding characteristics of the latex emulsions make the products of the present invention suitable as adhesives for a wide variety of substrates such as wood, glass, metal, paper, polyethylene and other materials. The novel products may be applied to the surfaces of the substrates by spray, brush, roller, or other convenient coating means. Areas of applications for the present products include film coatings, household glue, shoe-folding adhesives, labels for polyethylene and other waxy materials, packaging and other laminates either flexible or non-flexible weather formed under high or low pressure or under wet or dry conditions. Also, products of the present invention may be used in pressure-sensitive applications and as release-coatings by reducing and controlling the gauge of the film.

What is claimed is:

1. A permanently tacky terpolymer consisting of (a) 30 to 40 parts by weight of vinyl acetate, (b) 20 to 35 parts by weight of a monoalkyl ester of an α,β-ethylenically unsaturated monocarboxylic acid having 3 to 5 carbon atoms wherein the alkyl moiety contains 7 to 12 carbon atoms and (c) 30 to 40 parts by weight of a dialkyl ester of an α,β-ethylenically unsaturated dicarboxylic acid having 3 to 5 carbon atoms wherein each alkyl moiety contains 7 to 12 carbon atoms.

2. A terpolymer according to claim 1 wherein the monoalkyl ester is an ester of acrylic acid and the dialkyl ester is a diester of maleic acid.

3. A terpolymer according to claim 1 wherein the monoalkyl ester is 2-ethylhexyl acrylate and the dialkyl ester is di(2-ethylhexyl) maleate.

4. A permanently tacky terpolymer consisting of (a) 40 parts by weight of vinyl acetate, (b) 30 to 40 parts by weight of a dialkyl maleate wherein each alkyl moiety contains 7 to 12 carbon atoms and (c) 20 to 30 parts by weight of an alkyl acrylate wherein the alkyl moiety contains 7 to 12 carbon atoms.

5. A permanently tacky terpolymer according to claim 4 wherein the dialkyl maleate is diisooctyl maleate and the alkyl acrylate is 2-ethylhexyl acrylate.

6. A permanently tacky terpolymer consisting of (a) 40 parts by weight of vinyl acetate, (b) 40 parts by weight of di(2-ethylhexyl) maleate and (c) 20 parts by weight of 2-ethylhexyl acrylate.

7. A latex emulsion containing 54 percent to 56 percent by weight of a terpolymer consisting of (a) 30 to 40 parts by weight of vinyl acetate, (b) 20 to 35 parts by weight of a monoalkyl ester of an $\alpha,\beta$-ethylenically unsaturated monocarboxylic acid having 3 to 5 carbon atoms wherein the alkyl moiety contains 7 to 12 carbon atoms and (c) 30 to 40 parts by weight of a dialkyl ester of an $\alpha,\beta$-ethylenically unsaturated dicarboxylic acid having 4 to 5 carbon atoms wherein each alkyl moiety has 7 to 12 carbon atoms.

8. A latex emulsion according to claim 7 wherein the monoalkyl ester is 2-ethylhexyl acrylate and the dialkyl ester is diisooctyl maleate.

9. A latex emulsion containing 54 percent to 56 percent by weight of a terpolymer consisting of (a) 40 parts by weight of vinyl acetate, (b) 30 to 40 parts by weight of di(2-ethylhexyl) maleate and (c) 20 to 30 parts by weight of 2-ethylhexyl acrylate.

10. A latex emulsion containing 54 percent to 56 percent by weight of a terpolymer consisting of (a) 40 parts by weight of vinyl acetate, (b) 40 parts by weight of di(2-ethylhexyl) maleate and (c) 20 parts by weight of 2-ethylhexyl acrylate.

11. A process of adhering a plastic material to a dissimilar material which comprises coating a surface of one of the materials with the terpolymer of claim 1 and thereafter contacting said surface with the other material.

12. A plastic body at least a portion of which is coated with the terpolymer of claim 1.

References Cited by the Examiner

UNITED STATES PATENTS

| | | | |
|---|---|---|---|
| 2,430,564 | 11/1947 | Gordon | 260—78.5 |
| 2,544,691 | 3/1951 | Kugler et al. | 260—78.5 |
| 2,544,692 | 3/1951 | Kugler et al. | 260—78.5 |
| 2,636,024 | 4/1953 | Wolf | 260—80.5 |
| 2,978,372 | 4/1961 | Bergstedt et al. | 156—332 |
| 3,003,987 | 10/1961 | Hager et al. | 260—78.5 |
| 3,100,760 | 8/1963 | Brown et al. | 156—332 |
| 3,164,562 | 1/1965 | Breed | 260—78.5 |
| 3,189,581 | 6/1965 | Hart et al. | 260—80.5 |

SAMUEL H. BLECH, *Primary Examiner.*

MURRAY TILLMAN, *Examiner.*

N. F. OBLON, *Assistant Examiner.*

UNITED STATES PATENT OFFICE
CERTIFICATE OF CORRECTION

Patent No. 3,275,589                      September 27, 1966

Robert R. Alexander et al.

It is hereby certified that error appears in the above numbered patent requiring correction and that the said Letters Patent should read as corrected below.

Column 6, line 39, for "weather" read -- whether --; line 52, for "3" read -- 4 --.

Signed and sealed this 22nd day of August 1967.

(SEAL)
Attest:

ERNEST W. SWIDER                      EDWARD J. BRENNER
Attesting Officer                      Commissioner of Patents